United States Patent
Schwarzhoff et al.

(10) Patent No.: US 6,591,260 B1
(45) Date of Patent: Jul. 8, 2003

(54) METHOD OF RETRIEVING SCHEMAS FOR INTERPRETING DOCUMENTS IN AN ELECTRONIC COMMERCE SYSTEM

(75) Inventors: Kelly Schwarzhoff, Napa, CA (US); Ramshankar Venkat, Milpitas, CA (US)

(73) Assignee: Commerce One Operations, Inc., Pleasanton, CA (US)

( * ) Notice: Subject to any disclaimer, the term of this patent is extended or adjusted under 35 U.S.C. 154(b) by 0 days.

(21) Appl. No.: 09/493,954

(22) Filed: Jan. 28, 2000

(51) Int. Cl.[7] ............................................... G06F 17/30
(52) U.S. Cl. ............................................. 707/2; 707/10
(58) Field of Search ....................................... 707/2, 10

(56) References Cited

U.S. PATENT DOCUMENTS

| | | | |
|---|---|---|---|
| 5,790,677 A | | 8/1998 | Fox et al. |
| 5,893,109 A | * | 4/1999 | DeRose et al. ............ 707/104.1 |
| 6,011,844 A | * | 1/2000 | Uppaluru et al. .......... 379/220.01 |
| 6,012,098 A | * | 1/2000 | Bayeh et al. ................ 709/246 |
| 6,028,605 A | * | 2/2000 | Conrad et al. .............. 345/840 |
| 6,049,785 A | | 4/2000 | Gifford |
| 6,125,391 A | * | 9/2000 | Meltzer et al. ............. 709/223 |
| 6,151,624 A | * | 11/2000 | Teare et al. ................ 709/217 |
| 6,154,738 A | * | 11/2000 | Call ............................. 707/4 |
| 6,167,448 A | * | 12/2000 | Hemphill et al. ........... 709/224 |
| 6,249,844 B1 | * | 6/2001 | Schloss et al. ............. 711/122 |
| 6,263,332 B1 | * | 7/2001 | Nasr et al. ..................... 707/5 |
| 6,317,783 B1 | * | 11/2001 | Freishtat et al. ............ 709/218 |
| 6,336,214 B1 | * | 1/2002 | Sundaresan ................. 717/143 |
| 6,341,353 B1 | * | 1/2002 | Herman et al. ............. 713/201 |
| 6,366,934 B1 | * | 4/2002 | Cheng et al. ................ 715/513 |
| 6,381,597 B1 | * | 4/2002 | Lin ................................ 707/4 |
| 6,385,583 B1 | * | 5/2002 | Ladd et al. .................. 704/270 |
| 6,393,456 B1 | * | 5/2002 | Ambler et al. .............. 709/200 |
| 6,397,219 B2 | * | 5/2002 | Mills ........................... 707/10 |
| 6,405,245 B1 | * | 6/2002 | Burson et al. .............. 709/217 |
| 6,484,156 B1 | * | 11/2002 | Gupta et al. ................... 707/1 |

OTHER PUBLICATIONS

F. Bergeron and L. Raymond, "Managing EDI for corporate advantage: A longitudinal study," Information & Management, 31, 1997, pp. 319–333, Elsevier.

(List continued on next page.)

*Primary Examiner*—Wayne Amsbury
(74) *Attorney, Agent, or Firm*—Ernest J. Beffel, Jr.; Haynes Beffel & Wolfeld LLP

(57) ABSTRACT

A method and computer system are described for conducting commercial transactions by the exchange of electronic documents. The computer system includes a transaction services network, which comprises a plurality of transaction servers for providing services to support commercial transactions. Trading partners operate servers which communicate with the transaction services network via the Internet. The electronic documents are exchanged between trading partners engaged in a transaction. The documents are written in a markup language such as XML. The tags used in the document instances are defined in schemas. Each schema defines a document type, which corresponds to a type of transaction. An enhanced type of XML schema may be used which supports integrity constraints and polymorphism. Schemas are identified by the use of Uniform Resource Names. XML processors residing on transaction servers or trading partner servers parse document instances by retrieving the URNs corresponding to the schemas used to interpret the document. The URNs are converted to location-specific URIs in order to locate the schemas. URNs are resolved to location-specific URIs by use of the LDAP protocol. URNs may be converted to LDAP URLs which are used to search LDAP compliant directories. The directories serve as registries for the location-specific URI values corresponding to the URNs.

47 Claims, 4 Drawing Sheets

OTHER PUBLICATIONS

Robert J. Bonometti, Raymond W. Smith, and Patrick E. White, "The Walls Coming Down: Interoperability Opens the Electronic City," The Future of the Electronic Marketplace, The MIT Press, Cambridge, Massachusetts, 1998, pp. 265–301.

Richard Bort and Gerald R. Bielfeldt, "EDI on the Internet," Handbook of EDI, 1997, pp. B7–1–B7–19, Warren, Gorham & Lamont, USA.

David Chappell, "Simple Object Access Protocol (SOAP)," Microsoft Windows: Simple Object Access Protocol Technical Article, Sep. 10, 1999, Microsoft Corporation.

P. Emerald Chung, Yennun Huang, Shalini Yajnik, Deron Liang, Joanne C. Shih, Chung–Yih Wang, and Yi–Min Wang, "DCOM and CORBA Side by Side, Step by Step, and Layer by Layer," Can be found at: http://www.cs.wustl.edu/~schmidt/submit/Paper.html.

Isabel Gallego, Jaime Delgado, and José J. Acebrón, "Distributed Models for Brokerage on Electronic Commerce," TREC'98, LINCS 1402, 1998, pp. 129–140, Springer–Verlag Berlin Heidelberg.

John J. Garguilo and Paul Markovitz, "Guidelines for the Evaluation of Electronic data Interchange Products," DRAFT—Technical Report CAML/CLS, Dec. 6, 1995, Gaithersburg, MD, USA.

Shikhar Ghosh, "Making Business Sense of the Internet," Harvard Business Review, Mar.–Apr. 1998, pp. 126–135.

Timothy A. Howes and Mark C. Smith, "A Scalable, Deployable, Directory Service Framework for the Internet," Apr. 28, 1995. Can be found at: http://info.isoc.org/HMP/PAPER/173/html/paper.html.

Li–Pheng Khoo, Shu Beng Tor, and Stephen S. G. Lee, "The Potential of Intelligent Software Agents in the World Wide Web in Automating Part Procurement," International Journal of Purchasing and Materials Management, Jan. 1998, pp. 46–52.

Frederick J. Riggins and Hyeun–Suk (Sue) Rhee, "Toward a Unified View of Electronic Commerce," Communications of the ACM, Oct. 1998, vol. 41, No. 10, pp. 88–95.

* cited by examiner

METHOD OF RETRIEVING SCHEMAS FOR INTERPRETING DOCUMENTS IN AN ELECTRONIC COMMERCE SYSTEM

BACKGROUND OF THE INVENTION

1. Field of the Invention

This invention relates to the exchange of electronic documents in an electronic marketplace. In particular, the invention relates to methods for retrieving schemas which are used to interpret electronic documents used in business to business transactions.

2. Description of the Related Art

Techniques exist for supporting the exchange of electronic data between trading partners. A prominent and commonly used standard is Electronic Data Interchange, more commonly referred to by its acronym EDI. EDI refers to a set of messages used for business-to-business communication. The messages are compiled into business documents, which are exchanged to facilitate transactions between trading partners.

Each organization using EDI typically stores its data in a private format. As such, trading partners employing EDI are typically required to contract in advance and develop software programs to map between their private data sets. Each time a new trading partner is added to a client list, a new translation program is required to format their data in conformance with the other trading partners on the list.

The EDI approach for supporting a commercial communications standard is to include the union of all universally required features into a global standard. EDI effectively includes a messaging standard for each transaction conducted between each set of trading partners. The inefficiencies which result from this system include the effort spent in generating a translator for every pair of trading partners and the redundancy inherent in generating original documents to facilitate largely similar transactions.

To resolve these inefficiencies, it is desirable to establish an effective communications standard for the electronic documents. This standard should allow document types to evolve in order to facilitate new transactions, while preserving the integrity of the existing document types and the transactions they support. Because the library of document types which are used in such a standard will be shared by all trading partners in the marketplace, these resources should be available throughout the marketplace.

SUMMARY OF THE INVENTION

The invention enables the creation of an electronic marketplace by facilitating the exchange of electronic documents between trading partners. Embodiments of the invention include communications standards for the electronic documents which enable trading partners to (1) construct documents which reflect the particular constraints of their transactions and (2) make such documents easily available throughout the marketplace. The communications standards employed in this invention optimize the efficiency of the creation and retrieval of the electronic documents, and, as such, the efficiency of the respective transactions.

In an embodiment of the invention, commercial transactions between trading partners are conducted via a computer network referred to as a transaction services network. The transaction services network is operated by a market maker interested in supporting an electronic marketplace, and the network provides services which facilitate the commercial transactions. The transactions are conducted by the exchange of electronic documents between trading partners. The transaction services network provides services for facilitating these transactions, such as matching trading partners to conduct certain types of transactions; routing documents between trading partners; providing information about trading partners; and establishing protocols to govern the transactions. The trading partners access the transaction services network via private servers which connect to the transaction services network via the Internet.

In embodiments of the invention, the documents supporting the transactions are written in an enhanced form of the Extensible Markup Language, XML. The XML standard is a markup language which allows document writers to define the tags which are used to express document instances. The ability to define the tags which are used in a document provides document writers with the facility to convey the semantic content of document instances by use of the tags embedded within the document instances, a feature which is unavailable in earlier generations of markup languages.

XML document instances are interpreted by the use of schemas which are cited in the document instances; the schemas define a collection of tags which are used to encode the document instances. As a schema may be used to interpret multiple document instances, the schema classifies a document type. The document types which are available in the invention support commercial transactions such as purchase orders, purchase order acknowledgements, order status checks, availability checks, price checks, invoices, and invoice acknowledgements. XML allows document writers to create schemas as necessary to support novel transactions.

Embodiments of the invention also support polymorphic XML documents. Polymorphism allows a document type to be explicitly defined as an extension of a pre-existing document type. Any document instance of the extending document type will also be a legal instance of the extended document type. As such, polymorphism allows the creation of an extension hierarchy of document types.

In an embodiment of the invention, the document instances contain identifiers for the schemas they cite. These identifiers are persistent and location independent. As such, the identifiers enable schemas to be identified irrespective of changes in the configuration of the underlying computer system. In some embodiments, the location identifiers are Uniform Resource Names (URNs).

In embodiments of the invention, URNs for schemas are resolved to location-specific Uniform Resource Identifiers, or URIs, which indicate the physical locations for the schemas. These physical locations may include HTTP sites, FTP sites, or file locations. In embodiments of the invention URNs are resolved to location-specific URIs by the use of a registry which maps URNs to the corresponding location specific URIs.

In embodiments of the invention, the Lightweight Directory Access Protocol, version 3 (LDAP v3) is used to search the registry for the location-specific URI. This protocol provides an efficient tool for searching the registry. The URN registry is stored in an LDAP v3 compliant directory server. The LDAP compliant directory server may be an x.500 server. In some embodiments, the URN is converted to an LDAP URL. The LDAP URL is used as a key to search the LDAP directory for the location-specific URI. In an embodiment of the invention, the directory server is accessible to any trading partner server or other server on the network which interprets XML documents. The use of a central directory server eliminates the need for replicated repositories, thereby lending scalability and consistency to the URN registry. In an alternative embodiment, the registry may be federated, so that different nodes of the directory reside on separate servers, thereby allowing control over particular URNs to be vested with the parties responsible for the resources identified by the URNs.

DETAILED DESCRIPTION

A. Introduction

The invention addresses problems faced in the construction of an electronic marketplace for business to business transactions. In particular, the electronic marketplace considered by the invention includes a computer network system which facilitates transactions between trading partners; these transactions are conducted by the exchange of electronic documents which correspond to the particular transactions. For example, a purchase order from a seller to a buyer may be conducted by exchanging a PurchaseOrder document between the trading partners which specifies the terms of the transaction. The types of commercial transactions supported by the invention can include, but are not limited to, purchase orders, purchase order acknowledgments, order status checks, availability checks, price checks, invoices, invoice acknowledgement, and/or catalog documents.

Various services are required to facilitate such business to business electronic transactions. For instance, buyers and sellers may be matched to conduct certain types of transactions; documents are routed between trading partners; information about trading partners should be readily available; and protocols should be established to govern the transactions. Moreover, a market system which facilitates commercial transactions should be scalable, as a system flexible enough to support a multitude of transactions should allow for trading partners to be continuously added to the marketplace.

B. Overview of the Electronic Marketplace

Figure 1:
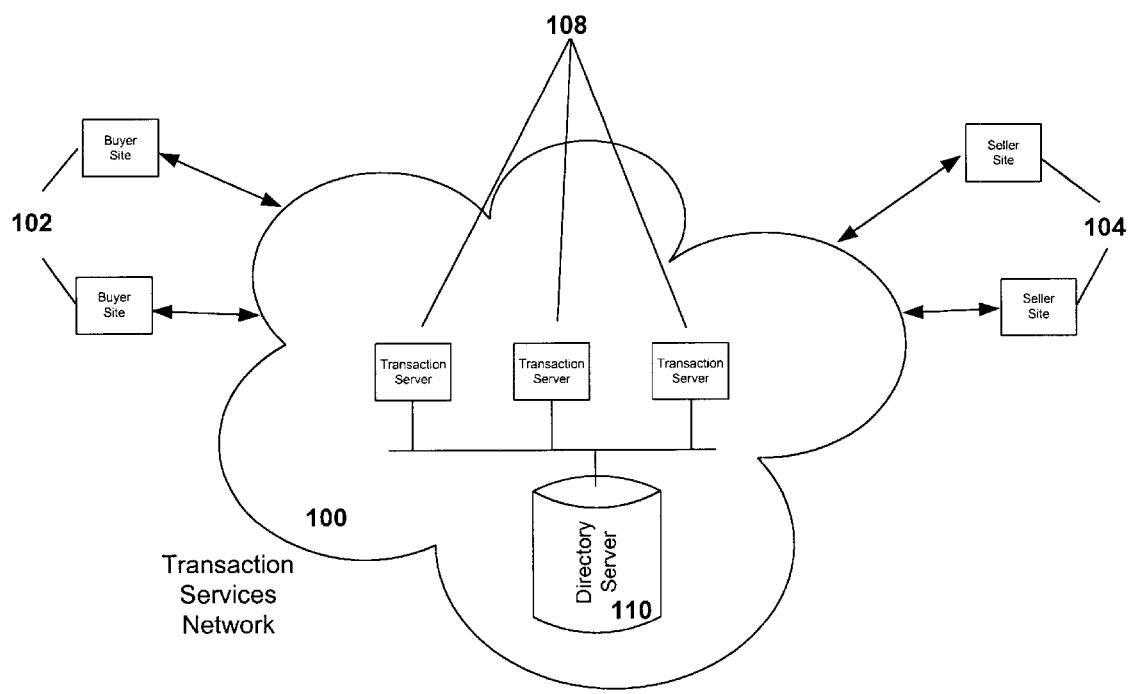
FIG. 1 is a schematic depiction of the network layout of the electronic marketplace in an embodiment of the invention.

In an embodiment of the invention, these services are provided by a network of computers illustrated in FIG. 1. The network providing the services 100 is referred to as a transaction services network 100; the transaction services network is typically operated by a "market maker", i.e., a body which is interested in facilitating an electronic marketplace. Buyer sites 102 and seller sites 104 connect to the transaction services network 100 via the Internet. The network includes a group of transaction servers 108 which provide various commercial services. Transaction servers 108 may be added to the network as necessary, thereby lending scalability to the transaction services network 100.

Previous attempts at establishing electronic marketplaces have lacked an adequate standard for communication between trading partners. This deficiency results in the generation of redundant documents, and fails to provide efficient tools for constructing new transactions from old documents. As such, it would be desirable to enforce a communications standards within the marketplace which expedites the modification of existing documents and eliminates redundancy in the collection of documents, while retaining the flexibility to accommodate novel transactions.

C. XML as the Basis of a Commercial Communication Standard

It is desirable to establish a communication standard for encoding the transactions which are conducted in the electronic marketplace. The standard should be flexible and expressive enough to encode any possible transaction between trading partners. The standard should also enable the efficient creation of new transactions from old transactions, and thereby eliminate the need to create and interpret redundant messages in the electronic marketplace.

In an embodiment of the invention, the transactions are encoded in documents written in markup languages. These documents are exchanged between trading partners to facilitate transactions in the marketplace. Documents written in a markup language are interpreted by the use of embedded tags; examples of such languages include HTML and SGML.

In an embodiment of the invention, the markup language used to write the electronic documents is an enhanced version of XML. Standard XML is a markup language which allows a document writer to define the set of tags which are used to interpret a given document "instance". The collection of tags are defined in a file referred to as a "schema", and every instance of an XML document is interpreted by reference to the schemas cited by the instance. Because a schema defines a collection of tags which may be used to interpret multiple document instances, a schema is said to define a "document type". Correspondingly, an instance of a document type comprises an XML document which cites the respective schema. In standard XML, schemas are defined in Document Type Definition files, or DTDs. A DTD corresponding to a document type may be external or internal to instances of that document type.

XML document instances are validated at two levels: each document is checked for (1) conformance to XML syntax and (2) conformance with referenced schemas. The distinction between these levels of conformity can be illustrated by example. Consider a specific purchase order document instance of the document type PurchaseOrder. Suppose we have a document type PurchaseOrder and an instance of PurchaseOrder that we call PO_Instance. PO_Instance would be a specific purchase order sent through the marketplace. If PO_Instance conforms to a set of general syntactical criteria specified by standard XML we say that PO_Instance is "well-formed." If, in addition, PO_Instance is correct with respect to PurchaseOrder we say that PO_Instance is "valid" with respect to PurchaseOrder. Validity is a stricter requirement than well-formedness, as a document instance can be well-formed even though it is not valid with respect to its document type.

In an embodiment of the invention, the XML document instances are parsed in an XML Processor. The XML Processor is an application which is responsible for understanding well-formed XML syntax and for validating XML documents. In an embodiment of the invention, each transaction server and each trading partner site may have an XML Processor, which allows each server to understand the documents exchanged within the marketplace.

Standard XML alone, however, is not entirely adequate to facilitate the electronic marketplace. Amongst the deficiencies of standard XML as an e-commerce protocol is that the language does not provide adequate means for checking integrity constraints on data. Moreover, conventional XML does not support polymorphic changes to schemas. As such, schemas must be entirely rewritten to accommodate minor changes to conventional transactions which have pre-existing schemas. The absence of polymorphism results in duplicated effort to create largely redundant schemas. This deficiency can be illustrated by example.

Consider a transaction such as a purchase order. Each individual seller in the marketplace is likely to have constraints on purchase orders which are unique to its business, and which should be reflected in any purchase order which it communicates to a buyer. Because standard XML does not allow polymorphic changes to existing schemas, each buyer in this example will have to write a purchase order schema to reflect their transaction constraints. This results in duplicated effort, and a multiplicity of largely similar schemas. As such, the invention includes enhancements to XML which resolve these deficiencies.

D. Enhanced XML and Polymoriphic Schemas

In embodiments of the invention, the standard XML schemas are extended with enhanced schema languages which support polymorphism and integrity constraints in XML Documents. Non-limiting examples of enhanced XML schema languages include Commerce One's SOX language and Microsoft's XDR standard.

Polymorphism allows a document type to be explicitly defined as an extension of a pre-existing document type. Any document instance of the extending document type will also be a legal instance of the extended document type. As such, polymorphism allows the creation of an extension hierarchy of document types. The extensions mechanism in a schema language should guarantee that document instances will always adhere to criteria that ensure the safe evolution of document types.

Figure 2:
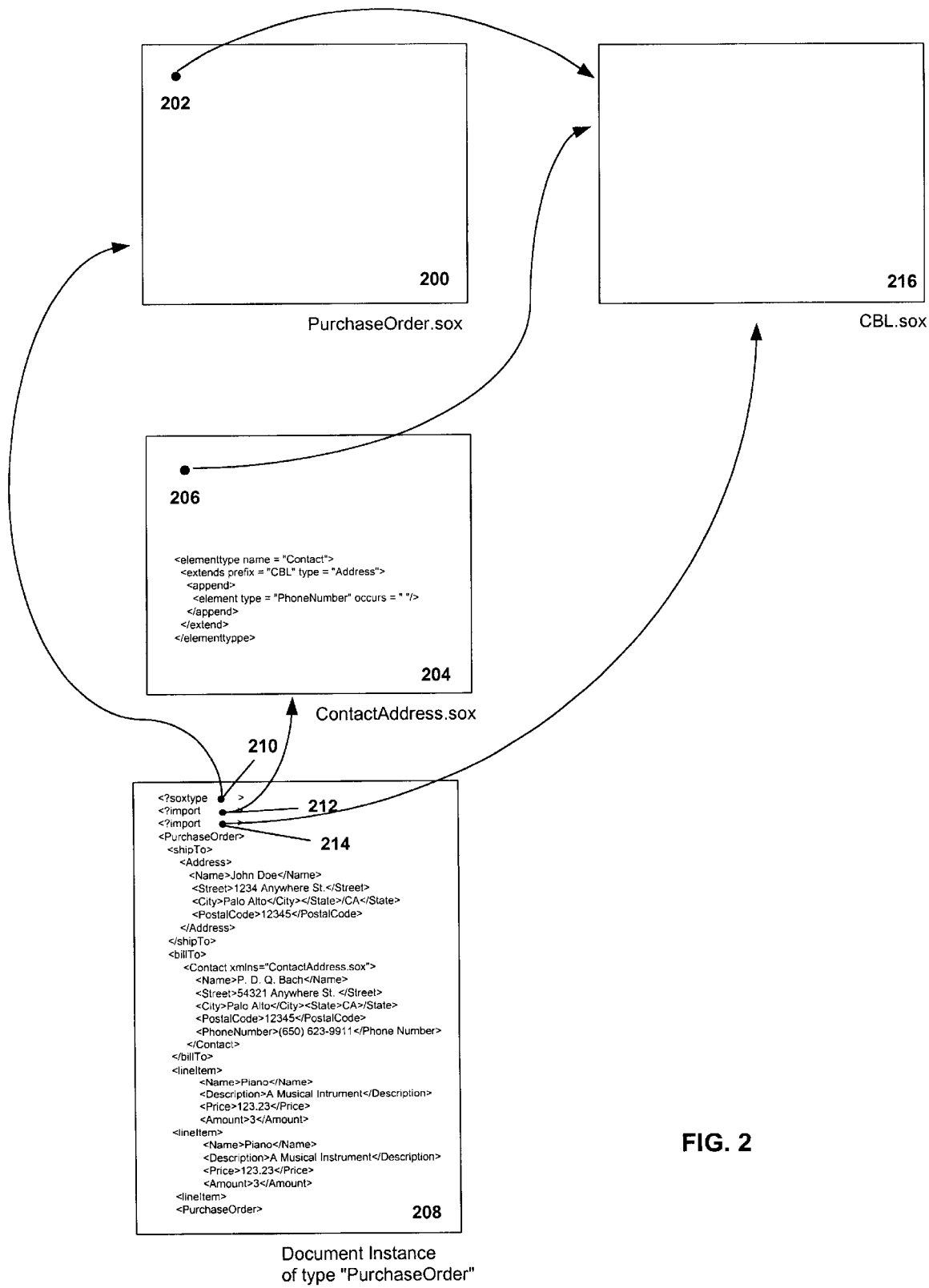
FIG. 2 illustrates the use of URNs for dynamically linking XML schemas and document instances in an embodiment of the invention.

The utility of polymorphic schemas in the electronic marketplace can be illustrated with an example depicted in FIG. 2. Note that while the schema language employed in this illustration is the SOX language, the example is equally valid for any enhanced schema language supporting polymorphism in XML. Assume that a group of trading partners have agreed on a schema for the document type PurchaseOrder. The schema corresponding to the document type is the PurchaseOrder.sox 200 schema. PurchaseOrder.sox 200 references tags from a preexisting library of SOX components in a file called CBL.sox 216; the acronym CBL stands for "Common Business Library." The PurchaseOrder.sox schema 200 includes an identifier 202 for CBL.sox 216. CBL.sox 216 includes a tag <Address> for supporting addresses. The <Address> tag has as sub-elements:

<Name>

<Street>

<City>

<PostalCode>

Suppose that <Address> is utilized by document instances of type PurchaseOrder and that a particular trading partner ACME wishes to make a simple extension to the <Address> element used in PurchaseOrder.sox 200. In particular, ACME wishes to extend the PurchaseOrder.sox 200 schema to allow the <Address> element to contain telephone numbers. The <Address> tag may be extended by using the SOX schema language to create a small document type ContactAddress, whose corresponding schema ContactAddress.sox 204 extends the CBL.sox 216 definition of <Address> to include a telephone number. The new document type includes an identifier 206 for CBL.sox 216. A document instance 208 of type PurchaseOrder incorporates the new <Address> tag by import statements which reference the schemas ContactAddress.sox 204 and CBL.sox 216 respectively.

The benefits of polymorphism are apparent from this example: we have changed the <Address> tag in a new, short document type, while preserving the integrity of the original PurchaseOrder document type. Without support for polymorphism, the new <Address> tag would require a rewrite of the PurchaseOrder. This would alter a fundamental document type which is an agreed upon standard amongst trading partners, one upon which a number of document instances and transactions are constructed, in order to accommodate a minor change. As a result, either (1) every trading partner would have to agree on the new PurchaseOrder, and software would need to be rechecked to ensure compliance with the new definition, or (2) the new schema would have a different name, and each time a trading partner wishes to send a purchase order, they would need to ensure whether the other partner supports the new PurchaseOrder or would need a translation to the old version.

To support polymorphism, the schemas should have the following characteristics:

The schemas must be available in a generally available repository to enable trading partners to retrieve them dynamically. The schema identifiers 202 206 210 212 214 should have globally unique names, aiding their dynamic discovery and loading When a trading partner receives a document instance, the <?import. . . > statement lists the schemata required to correctly parse it. As such, the recipient should be able to follow the identifiers 212 214 following the import statements in a document instance 208 to dynamically load the new schemata As such, the enhanced schema languages introduce new challenges to the implementation of a document exchange system. One of these challenges arises from the fact that the schemas in such languages evolve. To facilitate an e-commerce document exchange system, documents which are written prior to schema modifications should be able link at the time they are parsed to the modified schema. As the revised schema may reside in a different physical location in the document exchange system, the link to the schema in the document instance, which was written prior to the schema change, should remain valid. As such, polymorphism entails a need for permanent, location independent identifiers for schemas.

E. Modularity and the Need for Persistent, Location-Independent Identifiers

It is also desirable for XML entities to exhibit modularity, i.e., to allow XML entities to be re-used. To illustrate the desirability of this feature, suppose there is an XML document schema which is well-understood, and which defines tags that may be used in multiple document instances. If such a schema is available, it is desirable to re-use this schema in the multiple instances, rather than re-write it for each instance.

In order to be used by multiple document instances, it is desirable for a schema to have a universal name, which may be used by any of the document instances. This name should also be persistent, so that document instances referring to the schema remain valid indefinitely. Additionally, it is desirable for such names to be location-independent, so that references to the schemas remain valid even if the schema locations change. Thus the modularity of XML code also suggests a need for persistent, location-independent identifiers for XML entities.

F. Identifying Schemas with URNs

The invention offers a solution to the problems addressed above. In an embodiment of the invention, schemas are identified by persistent, location independent names. In a preferred embodiment, these identifiers include Uniform Resource Names, or URNs. Uniform Resource Names are described in RFC 2079. URNs are names for resources which may reside on LANs, WANs, or on the Internet. These names are characterized by two signal features:

1) URNs are persistent. As explained in RFC 2141, URNs are designed to last indefinitely, irrespective of changes in the configuration of the computer system on which the resources identified by URNs reside. This is in stark contrast to network addresses, IP addresses, or file locations, all of which identify physical locations on a network, and are invalid if the physical locations change.

2) URNs are location independent. This also contrasts with network addresses and file locations. A system resource identified by a URN will retain that URN even if its network location changes, which does not hold true for its IP address, LAN address, or file location.

In an embodiment of the invention, each schema is identified with a URN. This is illustrated in FIG. 2. The document instance 208 of type PurchaseOrder identifies the schemas PurchaseOrder.sox 200, ContactAddress.sox 204, and CBL.sox 216, by their respective URN identifiers 210, 212, 214. Likewise, the definitions for PurchaseOrder.sox 200 and ContactAddress.sox 204 identify CBL.sox 216 by its URN identifiers 202 206.

The syntax of URNs is specified in RFC 2141. They are specified in the following format:

<URN>::="urn:"<NID>":"<NSS> where <NID> is a Namespace Identifier, and <NSS> is a Namespace Specific String. An illustration of a URN is provided by the URN for the PurchaseOrder.sox 200 schema in the invention, which is given by:

urn::x-commerceone:document:com:commerceone:marketsite:businessservices:PO.sox$1.0 wherein the NID is x-commerceone and the NSS is document:com:commerceone:marketsite:businessservices:PO.sox$1.0

When an XML processor reads a schema, the processor locates the schema from the URN. This requires resolving the URN to a physical location, such as a network location, IP location, or file location. As such, embodiments of the invention also include a method for resolving URNs to physical locations.

G. Resolving URNs via a Registry

In an embodiment of the invention, URNs are mapped to physical locations by converting the URNs to location-specific URIs, or Uniform Resource Identifiers. Uniform Resource Identifiers, which are described in RFC 2396, may identify physical locations for computer system resources. In particular, location-specificURIs may take the form of network locations such as HTTP, FTP, or Telnet sites, or file locations within a computer system. To resolve URNs to physical locations, the present embodiment maps URNs to location-specific URIs, and correspondingly maps permanent, location independent identifiers to actual physical locations. The method used for this mapping should be scalable, in order to facilitate the addition of new schemas and document types to the marketplace, and should allow for easy retrieval and updating, as the network locations of the schemas may change frequently. Moreover, the mapping method should enable each server in the marketplace with an XML Processor 302, i.e., buyer sites 102, seller sites 104, transaction servers 108, to access the schemas, and interpret documents. As such, the method of URN resolution should also be accessible to each server in the marketplace.

Embodiments of the invention address these issues by employing a registry for mapping URNs to location-specific URIs. The registry resides on a directory service which is accessible by any site in the electronic marketplace, i.e., by any of the trading partner sites or any of the transaction servers within the transaction services network. FIG. 1 depicts this feature of the electronic marketplace. The buyer sites 102, seller sites 104, and the transaction servers 108 all communicate with the URN registry in the Directory Server 110. This layout lends scalability to the system, as any transaction servers or trading partner servers may also communicate with the registry.

To resolve the URNs by use of the registry, an access protocol is needed to retrieve the schema name from the x.500 directory. An embodiment of the invention utilizes the Lightweight Directory Access Protocol, or LDAP. The LDAP v3 protocol is a client-server protocol for performing lookups on a remote directory server. In the invention, the protocol is used to enable the transaction servers and trading partners to retrieve resource locations via the registry.

Figure 3:
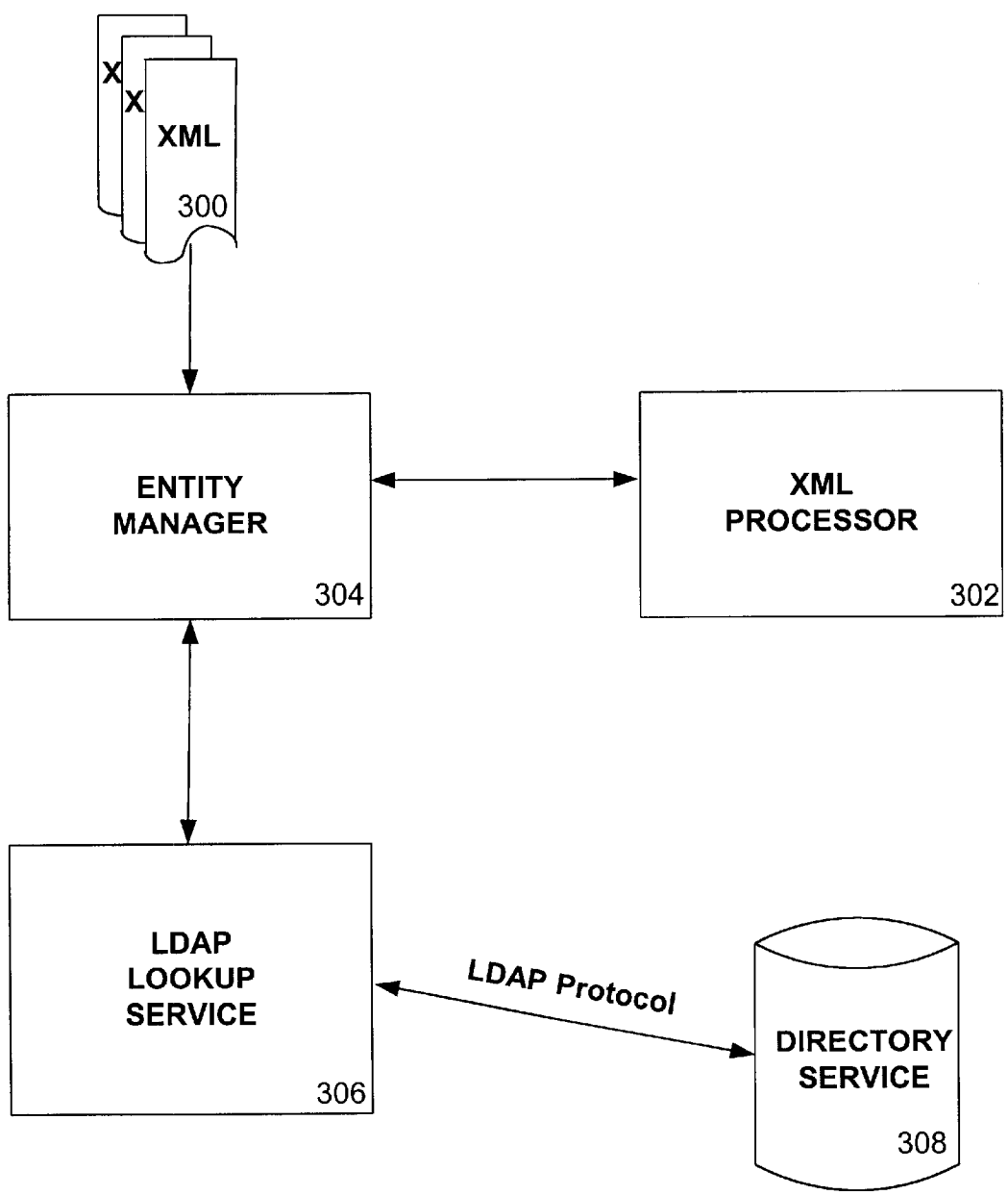
FIG. 3 illustrates the applications responsible for parsing XML documents in an embodiment of the invention.

FIG. 3 depicts the use of LDAP to retrieve schema locations from a directory. An Entity Manager 304 receives an XML document instance 300. The entity manager is an application which may run on any transaction server or trading partner site: the application manages XML document streams and facilitates the opening and tracking of URI based resources which the XML document system requires or references. The information collected by the Entity Manager 304 is passed to an XML Processor 302, which is responsible for understanding well-formed XML syntax. Upon parsing the XML document instance 300, the XML Processor 302 sends a URN for the schema to the Entity Manager 304. The Entity Manager 304 engages an LDAP Lookup Service 306 which searches for a location-specific URI corresponding to the URN in a directory service 308.

In an embodiment, the LDAP compliant directory service 308 used to resolve the URNs comprises an X.500 server. In alternative embodiments, the directory service 308 may be any other type of directory service which has functionality similar to LDAP v3. The X.500 directory server is described in detail in RFC 2253. In an LDAP compliant directory service such as X.500, the directory service stores primary keys as "Distinguished Names", which are commonly referred to as "DN"s. A DN is composed of a string of attribute values. The types of attributes include:

CN Common Name

OU Organization Unit Name

O Organization Name

A DN comprises a string of one or more attribute values for the attribute types listed above. The attribute types are organized in a tree-based hierarchy, which facilitates the search and retrieval of distinguished names. In the invention, the DN serves as the primary key for retrieving a corresponding location-specific URI from the x.500 directory.

Prior to using the DN as a key for retrieving a corresponding location-specific URI for a schema, the URN for that schema should be mapped to the DN. This step is performed by use of an LDAP URL. The LDAP URL standard is described in RFC 2255. This standard specifies a syntax for converting URNs to Distinguished Names. In an embodiment of the invention, the Entity Manager 304 is responsible for converting the URN to an LDAP URL. The Distinguished Names are then available to the LDAP protocol to search LDAP compliant directories. The search through the directory is performed by the LDAP Lookup Service 306.

The schema retrieval procedure outlined above comprises the following steps:
1) Take the input URN, perform a mapping to an LDAP URL
2) Take the LDAP URL from step 1 and convert to a DN to search the LDAP directory.
3) Locate the location-specific URI corresponding to the URN by searching the LDAP directory with the DN.
4) Locate and retrieve the schema by use of the URI The steps of this procedure shall be illustrated by the following, non-limiting example, in which a schema is retrieved from its URN.

H. Example: Retrieving a Purchase Order Schema from its URN

In this example, a PurchaseOrder.sox 200 schema is to be retrieved by an XML Processor 302. The URN for Purchase-Order.sox 200 is specified as urn::x-commerceone:document:com:commerceone:marketsite:businessservices:PO.sox$1.0 which comprises the following components:

NI=x-commerceone
NSS=
   document:com:commerceone:marketsite:businessservices:PO.sox$1.0

In an embodiment of the invention, the Namespace Identifier, or NI, for all schemas is "x-commerceone." The Namespace Specific String, or NSS, is divided into two parts, one representing the "logical directory" and the other portion representing the version of the document. These two portions of the NSS are delimited by the "$" token. Hence the logical directory is given by document:com:commerceone:marketsite:businessservices:PO.sox and the version is given as 1.0

The logical directory is a hierarchical name for the document which is delimited by colons":". This hierarchy corresponds to the hierarchy in the LDAP directory relative to a Schema Root in reverse order. The Schema Root is a Distinguished Name representing the logical origin for the schema entries in the directory tree. In this example, the Schema Root is given by:

ou=schema, o=Marketplace B

The next step is to convert the URN as specified above into a corresponding LDAP URL. The format for a standard LDAP URL, as specified is RFC 2255, is given as follows:

Ldapurl=scheme":// [hostport]["/"[DN ["?"[attributes][?" [scope]["?"[filter][?"extensions]]]]]]

The parameters used in the mapping are "Scheme", "hostport", and "DN". The scheme in this case, equals "LDAP". The hostport will be given as "/". This token indicates to the Entity Manager 304 that the host and port will be resolved at during the directory lookup. The DN for the Purchase Order in the present example will be:

cn=PO.sox,
ou=n1_0
ou=businessservices
ou=marketsite
ou=commerceone
ou=com

The remaining parameters in the LDAP definition are not used. Hence the LDAP URL for the Purchase Order should be LDAP:///cn=PO.sox,ou=n1_0,ou=businessservices,ou=marketsite,ou=commerceone,ou=com An example of an algorithm which performs the mapping is given as follows:
1) Initialize string variable for storing the output LDAP URL
2) Insert "LDAP:///" into the variable
3) Remove the prefix "urn:x-commerceone:document" from the input URN. If this prefix is not present, then trigger an exception
4) Parse each token in the URN delimited by ":".
5) Insert each token into a LIFO buffer
6) The remaining portion of the input URN is the version component. Remove the "$" delimiter and store the remainder as a version string.
7) If the string is not "1.0", the schema is not version compliant, so trigger an exception
8) Remove the first token from the LIFO buffer and store into a string variable labeled "DocName"
9) Create a string for the DN by inserting the DocName string preceded by "cn=" and terminated with ","
10) If the version string starts with a digit, it is prefixed with "n" and the "." is replaced with a "_". In the present example, the version string "1.0" will be mapped to "n1_0"
11) Append the modified version string to the DN prefixed by "ou=" and terminated with ","
12) For each token in the LIFO buffer, prefix the token with "ou=", terminate the token with "," and append the modified token to the DN string. The final token in the LIFO buffer should be terminated with "."
13) Insert the DN string into the LDAP URL The result of the mapping algorithm applied to the current URN is LDAP:///cn=PO.sox,ou=n1_0,ou=businessservices,ou=marketsite,ou=commerceone,ou=com The DN embedded in the LDAP URL is used to by an LDAP Lookup Service 306 to search the x.500 directory.

Figure 4:
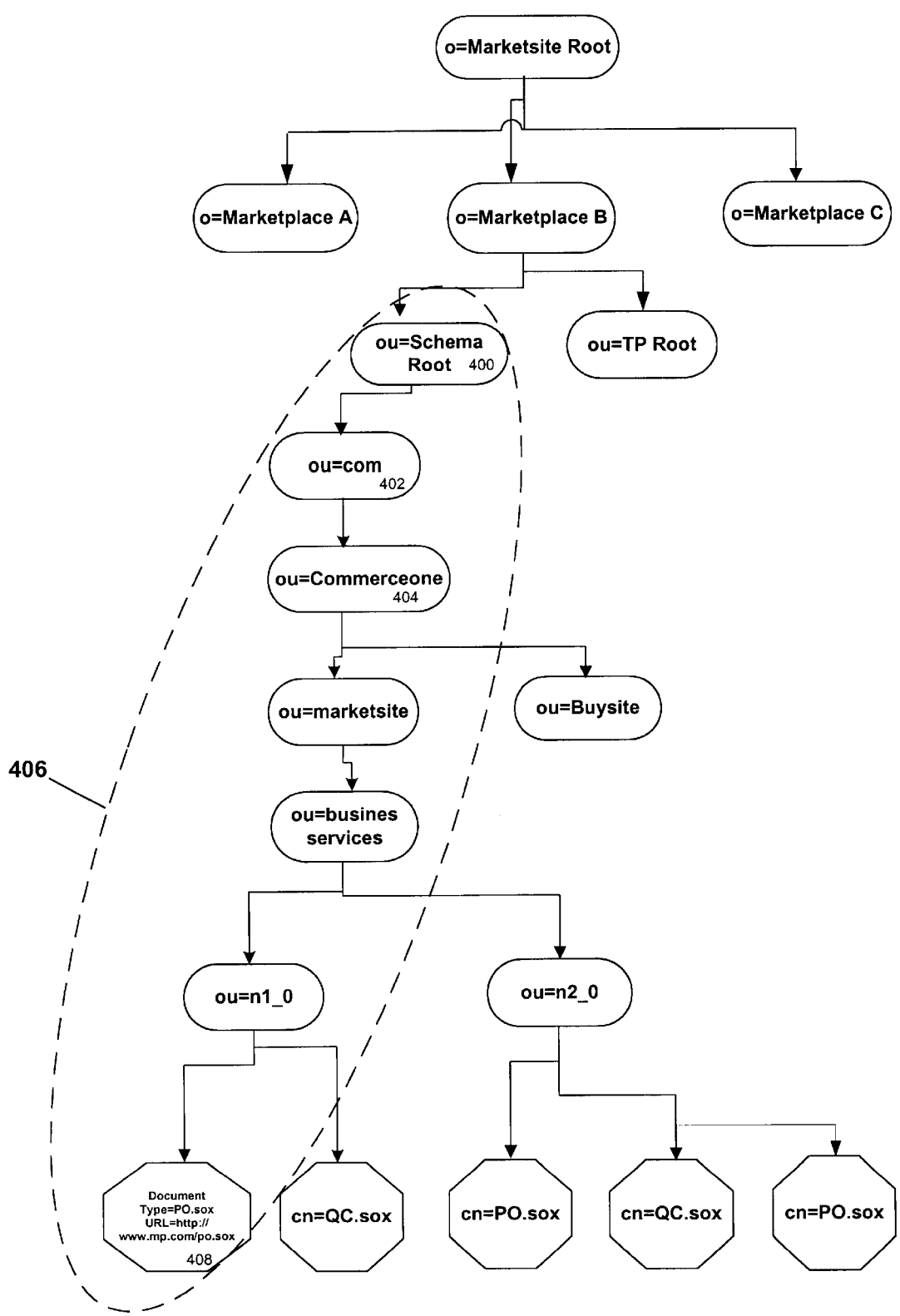
FIG. 4 illustrates an LDAP directory tree used to resolve URNs in an embodiment of the invention.

FIG. 4 is an illustration of the directory tree. The nodes of the tree correspond to attributes in the DN, and the leaves contain URIs for various schemas. The LDAP Lookup Service uses the third "/" as an indication of the host and port, which brings it to the Schema Root Node 400. The DN is now traversed in reverse order. The "ou=com" attribute brings us to the corresponding node in the LDAP tree 402. The next attribute is ou=commerceone, which has a corresponding node 404. The path 406 can be seen to correspond directly to the DN specified in the LDAP URL, wherein each attribute "ou" has a corresponding node in the path 406. The search ends at the leaf node 408, which contains the desired URI, which in this case, is http://www.mp.com/po.sox The schema retrieval system described in this example meets the criteria which were established earlier, such as persistence and location-independence, and exhibits a number of virtues which may not be immediately apparent. These features merit further elaboration.

I. Advantages of the Invention

Amongst the criteria listed for the schema identifier are persistence and location independence. The persistence and location independence of the URN is achieved by the provision of a centralized URN Repository which is easily updated. The registry, in an embodiment of the invention, is an x.500 directory, with a directory tree as given in FIG. 4. A physical location for a given resource can be updated simply by updating the corresponding leaf node. For instance, suppose the location of the Purchase Order schema in the example above is changed to http:// www.marketsite.net/foo. This can be facilitated simply by replacing the current contents of the leaf node 408 with the new URL. Hence the corresponding URN is persistent, for the URN remains constant even though the old URL is obsolete. The URN is also location independent, as the physical location of the resource is at a new network location while the URN has remained constant. Thus, any documents referring to the schema by the URN remain valid under the location change.

Maintaining a centralized URN Repository lends scalability, integrity, and flexibility to the schema retrieval system. The provision of a centralized repository eliminates a need for replicated lists of schema locations. This frees memory in the system for other uses. The centralized repository also contributes to the scalability of the system, as any new server added to the system can access schemas simply by accessing the URN Repository. The elimination of replicated lists also preserves the integrity of the schema locations, for the system makes updates to the registry relatively simple, as elaborated above, and the centralized nature of the repository eliminates the possibility of contradictory location information for schemas. Embodiments of the invention also expedite schema retrieval. Because the URN Repository is stored in a directory tree, the search for the network location is faster than a flat file repository by a logarithmic factor.

J. Alternative Embodiments

An alternative embodiment for the repository includes a federated directory service, in which the individual nodes of the directory service reside on separate servers. In an embodiment of the invention, schemas unique to particular trading partners are stored on sites which are operated by the trading partners. For instance, a particular buyer may modify a PurchaseOrder schema to suit their requirements. In an embodiment of the invention, those nodes of the LDAP tree which lead to a leaf with the URI for the modified PurchaseOrder reside on sites under the control of the buyer. This embodiment enables the buyer site to update nodes leading to a particular schema location itself, without going through a central directory service. As such, this embodiment decentralizes the process of updating the Directory Service, while preserving the integrity of the directory and eliminating the need for replicated URN repositories.

K. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method of processing documents in a distributed electronic commerce computing system, the method comprising:
    creating an electronic document, the document containing a network location independent identifier of a commerce schema, the commerce schema defining validity constraints for interpreting the electronic document;
    processing the document, including resolving the network location independent identifier to determine a hierarchically resolvable network location dependent identifier;
    using the location specific identifier to access the commerce schema;
    using the commerce schema to interpret the document.

2. The method of claim 1, wherein the electronic document is written in a markup language.

3. The method of claim 2, wherein the markup language comprises XML.

4. The method of claim 1, wherein the network location independent identifier comprises a Uniform Resource Name (URN).

5. The method of claim 1, wherein the network location specific identifier comprises a Uniform Resource Locator (URL).

6. The method of claim 1, wherein the network location independent identifier is resolved by use of a directory access protocol.

7. The method of claim 6, wherein the directory access protocol is Lightweight Directory Access Protocol (LDAP).

8. The method of claim 1, wherein the document corresponds to at least one of a purchase order, a purchase order acknowledgement, an order status check, an availability check, a price check, an invoice, an invoice acknowledgement.

9. A computer network system for exchanging electronic documents, wherein the electronic documents are written in a schema-based markup language, the computer network system including a first server, a second server, a third server, and a fourth server, the computer network system comprising:
    memory for storing a first schema, the first schema comprising a file which defines tags in the markup language, wherein the memory for storing the first schema resides on the first server in the computer network system;
    memory for storing a document instance written in the markup language, the memory for storing the document instance residing on the second server in the computer network system, wherein the document instance is interpreted by use of the first schema, and the document instance contains a location independent identifier for the first schema;
    a parser for the markup language, the parser comprising a computer program residing on the third server connected in the computer network system, wherein the parser receives the document instance from the second server;
    a directory service in communication with the parser, the directory service residing on the fourth server in the computer system;
    wherein the parser processes the document instance by retrieving the location independent identifier for the first schema, and searches for a corresponding location specific identifier in the directory service.

10. The computer system of claim 9, wherein the directory service includes a plurality of nodes arranged in a tree data structure.

11. The computer system of claim 10, wherein the location specific identifier is contained in a leaf of the tree data structure.

12. The computer system of claim 10, wherein the schema based markup language comprises XML.

13. The computer system of claim 10, wherein the processor searches for the location specific identifier in the directory server by use of a Lightweight Directory Access Protocol (LDAP).

14. The computer system of claim 10, wherein the directory server is LDAP compliant.

15. The computer system of claim 14, wherein the directory server comprises an x.500 directory server.

16. The computer system of claim 14, wherein the content of the document includes information to facilitate a commercial transaction.

17. The computer system of claim 16, wherein the commercial transaction is at least one of a purchase order, a purchase order acknowledgement, an order status check, an availability check, a price check, an invoice, an invoice acknowledgement.

18. The computer system of claim 16, wherein the first, second, and third servers are administered by trading partners in a commercial transaction.

19. The computer system of claim 16, wherein the location specific identifier comprises a Uniform Resource Identifier (URI) indicating a physical location for the schema.

20. The computer system of claim 19, wherein the URI comprises an HTTP site.

21. The computer system of claim 19, wherein the URI comprises a file location.

22. The computer system of claim 19, wherein the URI comprises an FTP site.

23. The computer system of claim 10, wherein a first node in the plurality of nodes resides in a first server from the plurality of servers, and a second node in the plurality of nodes resides in a second server from the plurality of servers.

24. A method of processing document instances of a markup language, the method comprising:
retrieving a URN for a schema from a document instance, wherein the document instance is to be interpreted by use of the schema;
converting the URN to an LDAP URL;
searching for a URI corresponding to the schema in an LDAP directory, wherein the LDAP URL is used as a primary key in the directory;
retrieving the schema from a physical location indicated by the URI;
interpreting the document instance with the schema.

25. The method of claim 24, wherein the markup language comprises XML.

26. The method of claim 24, wherein the LDAP directory comprises an x.500 directory.

27. The method of claim 24, wherein the document instance describes a commercial transaction.

28. The method of claim 27, wherein the commercial transaction is at least one of a purchase order, a purchase order acknowledgement, an order status check, an availability check, a price check, an invoice, an invoice acknowledgement.

29. The method of claim 24, wherein the LDAP directory has the structure of an LDAP directory tree, wherein each leaf in the LDAP directory tree contains a URI for a schema.

30. The method of claim 29, wherein the LDAP directory includes a distributed directory.

31. The method of claim 24, wherein the URI comprises an HTTP site.

32. The method of claim 24, wherein the URI comprises an FTP site.

33. The method of claim 24, wherein the URI comprises a file location.

34. In a computer system for electronic commerce, a collection of electronic documents, wherein the documents are written in a markup language, the documents comprising:
a first document schema, the first document schema defining a first collection of tags;
a second document schema, the second document schema defining a second collection of tags, such that a tag from the second collection of tags extends a definition of a tag in the first collection of tags;
a document instance, the document instance further comprising an first identifier for the first schema
a second identifier for the second schema
text embedded with a plurality of tags from the first collection of tags and a plurality of tags from the second collection of tags, the plurality of tags from the second collection including the tag from the second collection of tags which extends the definition of the tag in the first collection of tags.

35. The documents of claim 34, wherein the first and second identifiers comprise URNs for the first and second schemas, respectively.

36. The documents of claim 35, wherein the markup language comprises XML.

37. The documents of claim 35, wherein the first document schema describes a commercial transaction.

38. The documents of claim 37, wherein the commercial transaction is at least one of a purchase order, a purchase order acknowledgement, an order status check, an availability check, a price check, an invoice, an invoice acknowledgement.

39. A computer system for processing document instances of a markup language, the computer system comprising:
means for retrieving a URN for a schema from a document instance, wherein the schema comprises a file containing definitions for tags in the markup language, and the document instance is to be interpreted by use of the schema;
means for converting the URN to a location-specific URI;
means for retrieving the schema from the location-specific URI.

40. The computer system of claim 39, wherein the means for converting the URN to the location-specific URI comprises means for converting the URN to an LDAP URL.

41. The computer system of claim 40, wherein the means for converting the URN to the location-specific URI comprises means for searching an LDAP directory with the LDAP URL.

42. A computer network system for processing XML documents, the computer network system comprising:
a communications channel;
one or more XML servers for interpreting XML documents, wherein each of the one or more XML servers includes an XML parser for parsing XML documents, and each of the one or more XML servers is in communication with the communications channel;
a directory server, wherein the directory server maps a plurality of URNs identifying a plurality of XML schemas to a plurality of URIs which locate the plurality of XML schemas, wherein the directory server is in communication with the communications channel.

43. The computer network system of claim 42, wherein the communications channel includes a local area network (LAN).

44. The computer network system of claim 42, wherein the communications channel includes a wide area network (WAN).

45. The computer network system of claim 42, wherein the communications channel includes the Internet.

46. The computer network system of claim 42, wherein the communications channel includes an Ethernet connection.

47. The computer network system of claim 42, wherein the directory server comprises an LDAP directory server.

* * * * *